Figure 1:
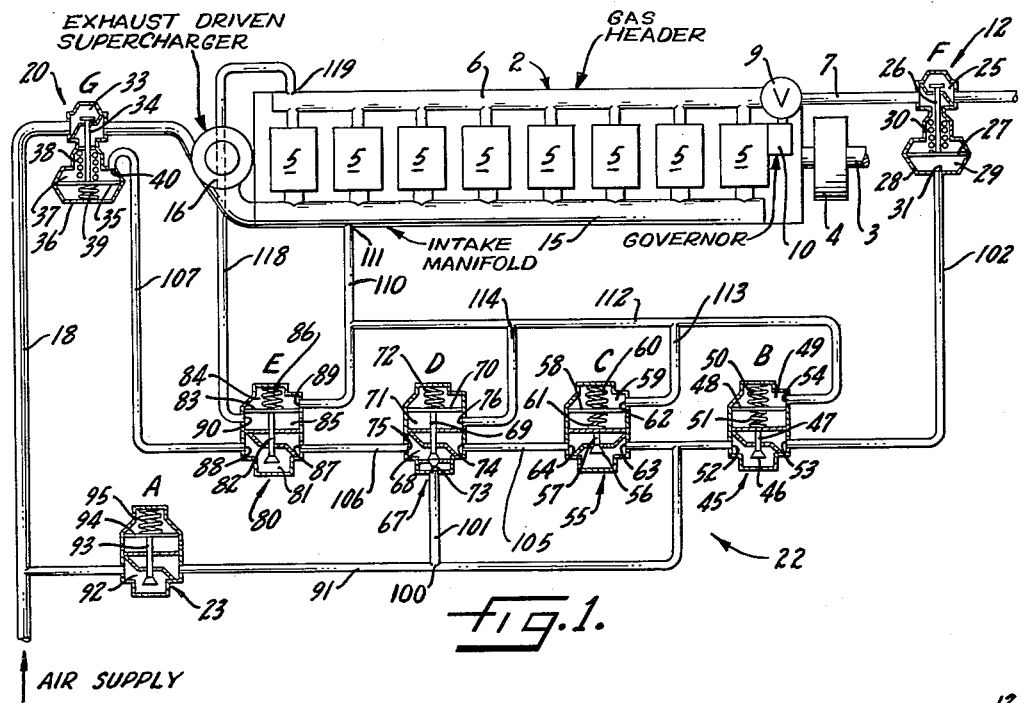

INVENTORS.
BRUCE G. ERICKSON
ADAM J. HENRIKSEN
BY Parker & Carter
Attorneys.

3,091,077
ENGINE CONTROL
Bruce G. Erickson and Adam J. Henriksen, South Milwaukee, Wis., assignors to Nordberg Manufacturing Company, Milwaukee, Wis., a corporation of Wisconsin
Filed Dec. 29, 1960, Ser. No. 79,410
29 Claims. (Cl. 60—13)

This invention relates generally to internal combustion engines and more particularly to a control system for regulating and coordinating air and fuel requirements in a supercharged internal combustion engine. It also relates to a method of regulating and coordinating air and fuel pressure in a supercharged engine.

With conventional exhaust driven supercharging systems, engine air requirements are ordinarily not met during starting operations since little or no energy is available to drive the turbocharger during this period. The resultant lack of inlet air header pressure is not too important in four cycle engines, which are self-breathing, unless such an engine has a locked in torque, but two cycle engines require sufficient header pressure for proper scavenging after the engine has fired initially. Without blower supplied air the cylinders are not adequately scavenged of combustion products.

Starting an internal combustion engine of the gas fuel type is further hampered by uncontrolled gas pressure in the cylinders when firing does not take place immediately. For example, as the engine is turned over by the starting motor it is not unusual for several revolutions of the crankshaft to take place before firing actually occurs. During this period gas is normally pumped into the cylinders just as though firing were actually taking place and consequently gas over flows into the exhaust header and muffler. As a result, exhaust header and muffler explosions frequently occur.

The operating efficiency of a supercharged internal combustion engine also varies substantially under varying load conditions once an engine is started. This is particularly true of two cycle engines of any fuel type. In a supercharged two cycle engine at lower loads and idling under no load, insufficient energy is supplied from the exhaust header to drive the turbocharger and consequently insufficient scavenging air reaches the air intake header. Actually, of course, some scavenging air is supplied, but the amount required ordinarily far exceeds the amount supplied. It is common practice to provide a separate motor driven until or a crankshaft driven blower to provide additional air for scavenging at low loads and idling.

Sudden load "bump" also tends to upset the equilibrium between air and fuel requirements in a supercharged internal combustion engine. This is true in both two and four cycle, gas, diesel and dual fuel engines. It is easy to see what the ordinary result of suddenly throwing a heavy load on a supercharged engine might be. Because of the flywheel effect of the turbocharger, the blower output will lag behind actual engine load. The fuel, be it diesel or gas, will at the same time be supplied by governor control according to the actual load on the engine. Under these circumstances, it will be obvious that the inlet air pressure will be too low. The result is an exceedingly rich mixture in the cylinders. In a diesel engine this rich mixture will only partially burn and result in billows of black smoke in the exhaust. In a gas engine, however, a rich mixture will not fire at all and the engine will ordinarily quit.

It is accordingly a primary object of this invention to provide a composite control system for efficiently regulating and coordinating air and fuel requirements in a supercharged internal combustion engine.

Another object is a control system including automatically regulated means for supplying an air jet assist for a turbocharger during engine starting.

Another object is a control system for automatically regulating gas pressure in two and four cycle gas fueled engines and preventing exhaust header and muffler explosions.

Another object is a control system including load responsive compressed air means for assisting turbochanger operation at idling and low loads.

Another object is means for assisting turbocharger operation at idling and low engine loads which eliminates the need for engine driven or auxiliary blowers.

Another object is a control system including automatically controlled air jet assist means for supplying additional energy to the turbocharger to maintain proper air-fuel ratios during load "bump" and rapid engine acceleration.

Another object is a control system for supercharged internal combustion engines which automatically regulates air and fuel requirements as a function of air intake header pressure.

Another object is a control system including means responsive to gas header pressure and air intake header pressure for providing automatic air jet assistance to a turbocharger during engine acceleration.

Another object is a control system including means for automatically regulating gas pressure during load "bump" and engine acceleration to coordinate it with air manifold pressure.

Another object is a control system including means for shutting off all air jet assistance to a turbocharger when a predetermined air inlet manifold pressure is reached.

Another object is a control system including means for establishing maximum permissible gas pressure and jet assistance air pressure.

Another object is a method of regulating and coordinating air and fuel requirements in a supercharged internal combustion engine.

These and other objects will be found in the following specification and claims wherein like reference numerals identify like parts throughout.

Figure 2:
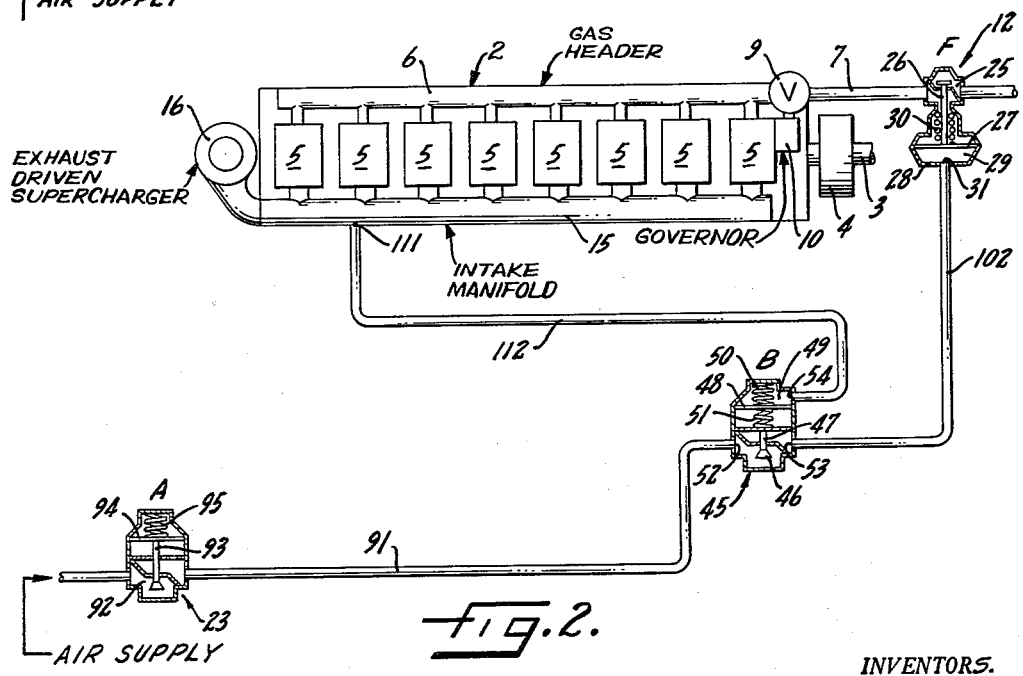
Figure 3:
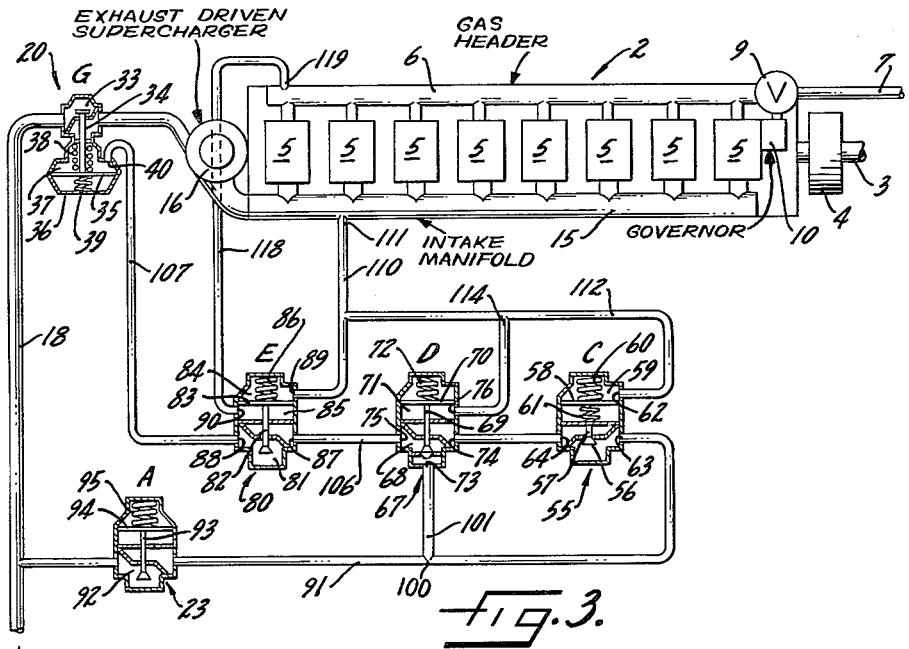
Figure 4:
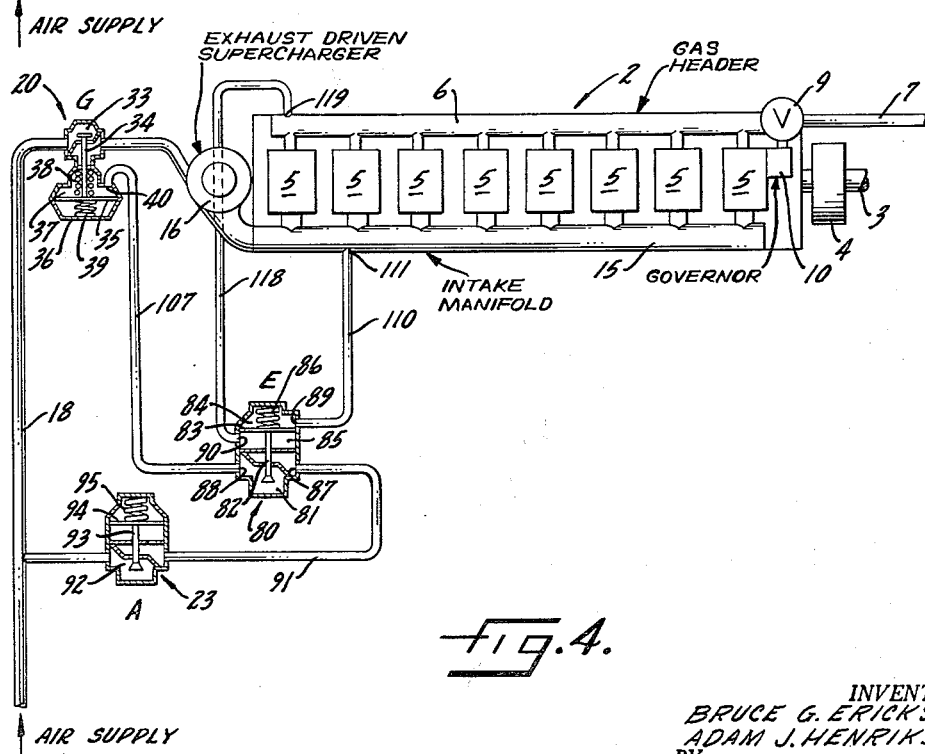

The invention is illustrated more or less diagrammatically in the drawings wherein several variations of the control system are shown:

FIGURE 1 shows the composite gas pressure and air inlet pressure control system, FIGURE 2 shows the system limited to gas pressure control, FIGURE 3 shows the system limited to air jet assistance control, and FIGURE 4 shows the system of FIGURE 3 further limited to air jet assistance control during load "bump" and acceleration.

FIGURE 1 illustrates a composite gas pressure and inlet air pressure control system as applied to a supercharged internal combustion engine 2. The engine shown is gas fueled and spark fired but it will be understood that this system might be adapted to diesel and dual fuel engines as well. Similarly, for purposes of explanation, engine 2 will be described as a two cycle engine though the system is also adaptable for use with four cycle engines.

Engine 2 includes crankshaft 3 and flywheel 4. The individual engine cylinders, indicated diagrammatically at 5, receive gaseous fuel through gas header 6 from fuel line 7. Fuel line 7 is connected to a conventional source of gaseous fuel (not shown). An engine gas control valve 9 is operatively associated with fuel line 7. Governor 10 regulates valve 9 as a function of engine load in a well-known manner, and can be pre-set by the engine operator. Also operatively associated with fuel line 7 is a secondary gas pressure valve 12.

An inlet air manifold 15 is connected to the engine cylinders 5 for delivering air under pressure from a conventional exhaust driven turbocharger 16. In a well-known manner, the engine exhaust feeder (not shown) is connected to drive the turbine of the exhaust driven turbocharger.

A compressed air pipe 18 extends to the exhaust driven turbocharger 16 and is adapted to direct a jet of compressed air to the turbine. Interposed in the air line 18 is a control valve 20 for regulating the amount of air jet assistance provided the turbine of the turbocharger 16.

The secondary gas pressure valve 12 and the air jet assist control valve 20 are regulated as a function of gas pressure in the gas header or air pressure in the air inlet manifold or a combination of the two. An air pressure signal drawn from air supply line 18 regulates the valves 12 and 20 through the medium of a series of intermediate control valves, shown generally at 22, and made responsive to gas header pressure and inlet air manifold pressure. A signal air pressure limiting valve 23 is interposed in this network.

Secondary gas pressure valve 12 includes a split valve chamber 25 opened and closed by valve operator 26. Valve operator 26 is connected to a diaphragm 27 interposed in bell enclosure 28. A pilot air signal chamber 29 is formed in bell enclosure 28 by diaphragm 27. The diaphragm and valve 26 are biased towards closed position by coil spring 30 such that operator 26 tends to close fuel line 7 to the passage of gas. A pilot air signal inlet port 31 is provided in chamber 29.

Valve 20 includes split valve chamber 33 having valve operator 34 extending thereinto. The valve operator 34 is connected to diaphragm 35 in bell enclosure 36. Diaphragm 35 forms one wall of a pilot air signal chamber 37. The diaphragm 35 and consequently the valve operator 34 are normally balanced in a valve open position by coil springs 38 and 39 on opposite sides of the diaphragm. This valve open position is effected when no pilot air pressure is present in the chamber 37. Pilot air signal inlet port 40 is provided in chamber 37.

The intermediate control valves 22 include a gas bias relay valve 45. Gas bias relay valve 45 includes a split valve chamber 46 having a valve operator 47 extending thereinto. Valve operator 47 is connected to diaphragm 48 which forms one wall of an air manifold signal chamber 49. The valve operator 47, when no air manifold pressure is present in chamber 49, is balanced by a pair of coil springs 50 and 51 to maintain a predetermined valve opening. Pilot air signal inlet port 52 and outlet port 53 are formed in the valve chamber 46. Air manifold signal inlet port 54 is formed in chamber 49.

Another of the intermediate valves 22 is jet assist bias relay valve 55. It is substantially identical in construction to relay valve 45. Valve 55 includes a split valve chamber 56, valve operator 57, diaphragm 58, air manifold signal chamber 59, balancing springs 60 and 61, air manifold signal inlet port 62, pilot air signal inlet port 63 and pilot air signal outlet port 64. Coil springs 60 and 61 balance diaphragm 58 and consequently valve operator 57 in a position calculated to permit a predetermined air signal passage to the valve outlet port 64 under predetermined conditions.

The series of intermediate valves 22 further includes a jet assist cut-off valve 67. Jet assist cut-off valve 67 includes a split valve chamber 68. Valve actuator 69 extends into valve chamber 68 and is operatively connected to a diaphragm 70 forming one wall of the air manifold signal chamber 71. A coil spring 72 normally biases actuator 69 into the position shown in FIGURE 1, closing off communication between valve chamber 68 and pilot air signal inlet port 73. Another pilot air signal inlet port is indicated at 74 and a pilot air signal outlet port is indicated at 75. An air manifold signal inlet port 76 is formed in the chamber 71.

The remaining intermediate valve in the series 22 is indicated generally at 80. Valve 80 might be referred to as an acceleration control valve and includes a split valve chamber 81. Valve actuator 82 extends into chamber 81 and is operatively connected at its opposite end to diaphragm 83. An air manifold signal chamber 84 is formed on one side of the diaphragm 83 and a gas pressure signal chamber 85 formed on the other side. The diaphragm and consequently the actuator 82 are normally biased towards a valve open position by coil spring 86. Under generally constant engine load conditions, the valve will be in the position shown in FIGURE 1. Pilot air signal inlet port 87 and outlet port 88 are formed in valve chamber 81. Air manifold signal inlet port 89 is formed in the chamber 84 and gas pressure signal inlet port 90 is formed in chamber 85.

An operating medium for the system in the form of pilot air pressure is tapped off the main air line 18. In the alternative, it might be taken directly from a compressed air source. The pressure source might be an air tank supplied by a conventional air compressor. The air compressor in turn might be driven by engine 2 for predetermined periods of time under optimum load conditions to build the tank pressure up to 250 to 300 p.s.i., for example, at which point an automatic cut-off would stop the compressor. This method of maintaining an air pressure source is only an example, however, and any means of supplying compressed air might be utilized. The high pressure compressed air at the source is reduced to a much lower working pressure for both the pilot lines and the main air line, however.

As was set out above, pilot air for the system illustrated in FIGURE 1 is tapped from the main line 18. The pilot line 91 extending therefrom has a signal pressure regulator valve 23 interposed therein. Valve 23 includes a split valve chamber 92 and a valve actuator 93 operatively connected at one end to diaphragm 94. Under atmospheric conditions, the coil spring 85 biases diaphragm 94 and consequently actuator 93 towards a valve open position. Valve chamber 92 is in communication with diaphragm 94. Diaphragm 94 and valve actuator 93 are thus controlled by the pressure in valve chamber 92. Consequently, it will be obvious that by making the coil spring 95 adjustable so that it may be set to a predetermined strength, the maximum pressure in pilot line 91 can be controlled.

Pilot line 91 has a T-branch 100 at one end. The T-branch 100 communicates with pilot air signal inlet port 52 in gas bias relay valve 45 and with pilot air signal inlet port 63 in jet assist bias relay valve 55. A branch line 101 connects pilot line 91 with pilot air signal inlet port 73 in jet assist cut-off valve 67.

Pilot air signal outlet port 53 of gas bias relay valve 45 is connected through pilot line 102 to pilot air signal inlet port 31 of secondary gas pressure control valve 12. Pilot line 105 connects pilot air signal outlet port 64 of jet assist bias relay valve 55 with pilot air signal inlet port 74 of jet assist cut-off valve 67. Pilot line 106 in turn connects pilot air signal outlet port 75 of jet assist cut-off valve 67 with pilot air signal inlet port 87 of acceleration control valve 80. Pilot air signal outlet port 88 of acceleration control valve 80 is in turn connected through pilot line 107 to pilot air signal inlet port 40 of air jet assist control valve 20.

Each of the series of intermediate control valves 22 is operatively connected to and responsive to the pressure in inlet air manifold 15 also. This relationship is facilitated by manifold pressure pilot line 110 connected to manifold 15 at 111 and at its other end to signal inlet port 89 in acceleration control valve 80. A branch air manifold pressure pilot line 112 connects signal inlet port 54 in gas bias relay valve 45 with pilot line 110. In turn, branch air manifold pressure pilot line 113 is connected to signal inlet port 62 of jet assist bias relay valve 55 and branch 114 is connected to signal inlet port 76 of jet assist cut-off valve 67.

Acceleration control valve 80 is also responsive to gas header pressure and this response is facilitated by gas pressure pilot line 118 connected at 119 to gas header 6 and at its other end to gas pressure signal inlet port 90 of acceleration control valve 80.

FIGURE 2 shows the system for use with a gas engine in which only gas pressure control is desired. Only a gas pressure control valve 12, a gas bias relay valve 45 and an air signal pressure regulator valve 23 would be necessary. These valves could be identical in all respects to those in FIGURE 1. The pilot line network could be simplified. For example, a single air manifold pressure pilot line 112 would connect inlet air manifold 15 with signal inlet port 54 in gas bias relay valve 45. Pilot line 91 would be connected directly to air signal inlet port 52.

If gas pressure control alone is not desired, the system might be modified as in FIGURE 3. The secondary gas control valve 12 and gas bias relay valve 45 along with their associated pilot line connections could be eliminated. The system could otherwise be identical to FIGURE 1.

It should be understood that the load responsive system described hereinabove could be made responsive to any load factor and is not necessarily restricted to gas pressure.

FIGURE 4, on the other hand, illustrates an inlet air pressure control system wherein only load "bump" control or engine acceleration control is desired. Here, the system has been modified to eliminate secondary gas control valve 12, gas bias relay valve 45, jet assist bias relay valve 55 and jet assist cut-off valve 67. All that remains is the acceleration control valve 80 and pilot air regulator valve 23 along with air jet assist control valve 20. The network of pilot lines remains substantially the same with air pilot line 91 being connected directly to air signal inlet port 87 in acceleration control valve 80. As before, load sensing can be done other than by gas pressure.

The use and operation of this invention is as follows:

The control system embodying this invention is best described as applied to a supercharged two cycle engine of the gas fueled type. To graphically relate the various functions of the system under pertinent engine operating conditions, the use and operation is best described by beginning with the starting operation of the engine itself.

Immediately prior to starting the engine, the operator opens the main air line 18 and consequently the pilot line 91 to the source of pressurized air.

At this time, the gauge gas pressure in manifold 6 will be zero as will gauge pressure in inlet air manifold 15. Each of the intermediate valves 22 has been constructed to establish a predetermined valve opening under these conditions. These openings in turn affect the pressure of the air signal delivered through the intermediate valves to air jet assist control valve 20 and secondary gas control valve 12.

The regulation of a secondary gas control valve 12 is affected by the valve opening in the gas bias relay valve 45. This opening is in turn determined solely by air pressure in the air inlet manifold 15. When the engine is started, it will be seen that there is no air inlet manifold gauge pressure; however, a gas supply is needed. So when the operator establishes the fuel rack setting to begin fuel feed to the gas header for starting the engine, the secondary gas control valve 12 must be open to a certain extent to allow a predetermined gas pressure to be established in the gas header. With a zero pressure signal in inlet manifold signal chamber 49 of gas bias relay valve 45, balancing springs 50 and 51 permit a minimum air signal to be delivered to air signal chamber 29 in secondary gas control valve 12. This minimum signal causes valve 12 to establish a gas pressure in the gas header. As a result of controlling gas pressure in this manner, when the engine turns over prior to starting excess gas pressure will not build up in the cylinders and cause gas overflow into the exhaust header and muffler where exhaust header and muffler explosions then frequently occur.

As the engine starts, the air pressure in the air inlet manifold 15 due to exhaust energy and also to jet assist, which will described hereinafter, increases and this signal causes the bias relay valve 45 to put an increasing air signal to regulator valve 12 which consequently affects the delivery of gas to the engine at the same pressure as the pilot signal it receives. Furthermore, the balancing springs 50 and 51 of gas bias relay valve 45 and internal areas can be pre-set so that gas pressure is ratioed as a function of inlet air manifold pressure. For example, if the relay valve were ratioed at 2, with a signal calculated to provide 1.5 p.s.i. of gas pressure when air inlet manifold gauge pressure is zero, when the air inlet manifold gauge pressure gets to 5 p.s.i., the signal to secondary gas control valve 12 would be 2 times 5 p.s.i. plus the original 1.5 p.s.i. bias or 10 p.s.i. plus 1.5 p.s.i. which would be 11.5 p.s.i. air signal. It will thus be seen that virtually any gas pressure-air manifold pressure relationship might be effected.

Jet assist bias relay valve 55 normally controls the air signal to the jet assist control valve 20. By normally is meant that under certain abnormal or otherwise specific operating conditions, overriding intermediate valves take over from the air jet assist bias relay valve 55. These certain operating conditions will be discussed hereinafter.

As will be seen from the position of the intermediate valves 55, 67 and 80 prior to starting of the engine and with the inlet air manifold gauge pressure and the gas header gauge pressure at zero, the valve 55 is open, valve 67 is closed to branch air signal line 101 and open to air signal line 106 and valve 80 is open. The amount to which valve 55 is open is pre-set by the relative strength of the balancing coil springs 60 and 61. With the valve open to the position shown in FIGURE 1, a minimum signal from pilot line 91 courses through valve chamber 56 in valve 55, valve chamber 68 in valve 67, valve chamber 81 in valve 80 and pilot line 107 to air signal chamber 37 in air jet assist control valve 20. Here, the balancing springs 38 and 39 are pre-set to permit maximum air jet assistance to turbocharger 16 when the minimum signal is present in air signal chamber 37. The action of valve 20 may be inverted if the bias relay 58 is constructed to invert the air signal in 113.

After the engine fires and begins to run at low load and idling and thereafter under increasing loads, the pressure in inlet air manifold 15 increases and, with this increase in pressure, air jet assist relay valve 55 is constructed to open proportionally further to permit an increasingly larger signal to be delivered to air jet assist control valve 20. As the signal to the air jet assist control valve increases, valve 20 closes generally proportionally and permits a lesser and lesser amount of air jet assistance to reach turbocharger 16. Thus, it will be seen that at low loads and under idling conditions, a large amount of jet assistance is provided the turbocharger, as there is during starting of the engine. Proper scavenging is consequently insured during these periods with re-resultant efficient engine operation.

When the air inlet manifold pressure reaches a certain predetermined figure, jet assist cut-off valve 67 takes over shutting off air signal inlet port 74 in valve 67 and opening ar signal inlet port 73. The result, as will be readily seen, is to by-pass jet assist relay valve 55 and send the air signal from pilot line 91 directly through jet assist cut-off valve 67 and acceleration control valve 80 to jet assist control valve 20. As a result of this "flip-flop" valve function of cut-off valve 67, air jet assist control valve 20 prevents any jet assistance from reaching turbocharger 16 once this predetermined by-pass pressure is reached. The effect is to provide a limiting pressure above which normally air jet assistance is not provided the engine. The desirability of this is easily understood since under normal steady load conditions in the higher range the turbocharger is completely self-sustaining. No air jet assistance is needed to aid the turbocharger in providing the pre-calculated proper air manifold pressure called for by the engine.

Under certain conditions, however, generally at medium and high loads, air jet assistance is required for turbocharger 16. These conditions are found when a load "bump" is felt by the engine. That is, when a heavier load is suddenly thrown on the engine. This causes the speed responsive governor 10 to immediately seek to supply a greater amount of fuel to the engine. Since the turbocharger must overcome its flywheel effect, it does not send additional air to the inlet air manifold as rapidly as fuel is received by the gas header. Consequently, in gas engines an over rich mixture results and the engine often dies. To remedy this situation an acceleration control valve 80 is provided. Control valve 80 is made responsive to both gas header pressure and inlet air manifold pressure and is balanced to be wide open when inlet air manifold pressure and gas header pressure maintain a predetermined balance. This valve relationship is controlled by setting the strength of the coil spring 86 in acceleration control valve 80. When the balance between the inlet air manifold pressure and the gas header pressure as signaled to the acceleration control valve 80 by pilot lines 110 and 118, respectively, is upset in such a manner that gas header pressure is higher by a certain amount than inlet air manifold pressure, the acceleration control valve 80 responds by closing as a function of this pressure differential and as a consequence air jet assist control valve 20 opens as a function of the differential. As valve 20 opens, of course, air jet assistance is provided turbocharger 16 and this in turn builds or tends to build up the pressure in inlet air manifold 15. With the build up of inlet air manifold pressure, the original balanced relationship between gas header pressure and inlet air manifold pressure tends to be re-established and acceleration control valve opens to increase the signal sent to air jet assist control valve 20 and consequently cause it to close. By virtue of this unique combination of valves, maximum engine efficiency is maintained even during periods when sudden loads are thrown upon the engine and gas fueled engines are not subject to over rich mixtures which result in the engine dying. Of course, as applied to diesel engines the over rich mixture is also eliminated and with it objectionable heavy black smoke in the exhaust.

To assist the re-establishment of the balance between air inlet manifold pressure and gas header pressure when the acceleration control valve does not respond quickly enough to immediately completely overcome the unbalance, the gas bias relay valve 45 tends to hold down gas pressure. This permits the inlet air manifold pressure to catch up with the gas header pressure more rapidly. Gas header pressure is held down by relay valve 45 in this manner since the manifold pressure to which it is responsive does not immediately increase to a degree consistent with the higher power setting called for by governor 10. In a sense, what the engine has is both a belt and suspenders. The acceleration control valve 80 causes air jet assistance to be delvered to the turbocharger under sudden acceleration conditions while the gas bias relay valve 45 tends to hold the gas pressure down to facilitate re-establishment of the predetermined balance as this balance is sought by the air jet assisted turbocharger.

Pilot air pressure regulator valve 23 in pilot line 91 is placed there primarily to limit maximum gas pressure. It accomplishes this since it limits the supply of signal air for gas pressure relay valve 45. No matter what the inlet air manifold pressure, a maximum signal can be delivered through gas bias relay valve 45 to secondary gas control valve 12. This is because the pressure limit is established at the outset in the regulator valve 23. This gives automatic overload engine protection by limiting maxmum fuel supply. The regulator valve 23 also limits the signal pressure available at air jet assist control valve 20, but its function is not as important in this case since valve 20 would ordinarily be already closed when such a signal is reached.

Under certain circumstances, it might be desirable to provide a modified system which provides control over only gas header pressure. This could be the case because of specific operating conditions under which the engine is utilized or for economic reasons or otherwise. Such a modified system is illustrated diagrammatically in FIGURE 2 of the drawings. In the control system shown in FIGURE 2, an air pressure signal to a secondary gas control valve 12 is regulated by gas bias relay valve 45 responsive to inlet air manifold pressure in the same manner described in the use and operation of the composite system illustrated in FIGURE 1. A pilot air pressure regulator valve 23 in the pilot line 91 acts as a pressure limiting control and, as in the system of FIGURE 1, might be pre-set at a 20 p.s.i. maximum. The system of FIGURE 2 provides a gas pressure limiting system directly responsive to air inlet manifold pressure. As a result, excessive gas pressure does not build up in the gas header causing overflow into the exhaust header and muffler with its concurrent danger of muffler and exhaust header explosions.

Sometimes it is desirable to operate an engine of this type with only a jet assist control system, eliminating the gas pressure regulation. A control system adatped to perform only the foregoing function is shown in FIGURE 3 of the drawings. The control system illustrated in FIGURE 3 is identical to that shown and described in FIGURE 1 with the exception that it eliminates the gas bias relay valve 45 and the secondary gas control valve 12 and their functions. Jet assist relay valve 55, jet assist cut-off valve 67 and acceleration control valve 80 remain in the intermediate control valve series. They function exactly as described in the operation of the composite system of FIGURE 1. In view of this, it is thought that no detailed explanation of their use and operation is necessary to the understanding of this modification of the system embodying this invention. Suffice it to say that air jet assist and control is provided at engine starting, idling and low loads and during periods of acceleration when the engine suffers load "bump."

In some instances, only a load "bump" and acceleration control jet assist system is necessary to the efficient operation of an engine of this type. Such a control system is illustrated diagrammatically in FIGURE 4 of the drawings. Here, the only valves required are the air jet assist control valve 20, the acceleration control valve 80 and the pilot air regulator valve 23. The acceleration control valve 80 is responsive to both gas header pressure and inlet air manifold pressure in the same manner that the acceleration control valve 80 is in the composite system illustrated in FIGURE 1 and described above. The efficiency of operation obtained is consequently identical to that described in the explanation of use and operation of the aforementioned composite system. The flywheel effect of the turbocharger 16 is countered by air jet assistance provided the turbocharger when it lags the engine gas pressure input due to load "bump" and acceleration. As a result, undesirably rich mixtures are substantially prevented, eliminating engine stoppages and inefficient utilization of fuel in both gas and diesel engines.

The systems of FIGURE 1, FIGURE 3 and FIGURE 4 are also adaptable to engines wherein gas feed means other than a carburating gas valve is utilized. In such case, the load upset signal to the acceleration control valve adapted to provide air jet assist during load "bump"

might be taken from the load signal on the governor 10 of the engine.

Although the control system embodying this invention has been described as applied to a two cycle gas fired engine, it is, of course equally applicable under many circumstances to four cycle gas fired engines and also to two and four cycle diesel and dual fuel engines. Of course the gas pressure control portion of the system would not be advantageous alone in conjunction with a diesel engine, but the system as a whole in all other instances would contribute to engine efficiency and safe and continuous operation.

It will be understood that the foregoing description of the system embodying this invention is illustrative only and many changes might be made without departing from the theme thereof. Accordingly, it is not intended that the description be definitive and the invention should be limited only by the scope of the appended claims.

We claim:

1. A system for regulating and coordinating inlet air pressure in an engine having an exhaust driven turbocharger supplying air to an inlet manifold and a fuel header comprising auxiliary means for supplying additional energy for driving the turbocharger, and means responsive to fuel header pressure and inlet air manifold pressure effective to actuate said auxiliary means to supply energy to the turbocharger when a predetermined balance between said fuel header pressure and said inlet air manifold pressure is upset by a sudden load being thrown upon the engine.

2. The system of claim 1 further characterized in that said auxiliary means comprises compressed air means.

3. The structure of claim 1 further characterized by and including means for energizing the auxiliary means so that additional energy will be supplied to the turbocharger during starting and low loads.

4. The structure of claim 1 further characterized by and including means for limiting the rate of supply of fuel when a rapid load increase is applied to the engine.

5. The structure of claim 1 further characterized in that said last-mentioned means is constructed to limit the fuel supply as a function of inlet manifold pressure during engine operation.

6. A system for regulating and coordinating inlet air pressure in an engine having a fuel header and an exhaust driven turbocharger supplying air to an inlet manifold comprising auxiliary means for assisting the turbocharger, and means responsive to inlet manifold pressure and to gas header pressure to actuate said auxiliary means when a predetermined balance between said gas pressure and said manifold pressure is upset by sudden load being thrown on the engine during operation.

7. A system for regulating and coordinating inlet air pressure in an engine having a fuel header and an exhaust driven turbocharger supplying air to an inlet manifold, comprising auxiliary means for assisting the turbocharger, means responsive to air inlet manifold pressure effective to actuate said auxiliary means when said manifold pressure is below a predetermined pressure, other means responsive to inlet manifold pressure, said other means also being responsive to fuel header pressure, said other means effective to actuate said auxiliary means when a predetermined balance between said fuel pressure and said manifold pressure is upset by an increased fuel supply being delivered to said header as a result of a sudden load being thrown on said engine.

8. The system of claim 7 further characterized by and including means responsive to air inlet manifold pressure effective to shut off said auxiliary means when a predetermined manifold presure is reached during engine operation.

9. A system for regulating and coordinating inlet air pressure in an engine having a gas header and an exhaust driven turbocharger supplying air to an inlet manifold comprising air jet means for driving the turbocharger, an air jet control valve associated with said air jet means for actuating and shutting off said air jet assistance, a source of compressed air, means for carrying signal air pressure from said source to said air jet control valve, said air jet control valve being responsive to a maximum signal pressure to shut off said air jet assist means and being responsive to a minimum signal pressure to actuate said air jet assist means, a jet assist relay valve connected to said signal pressure carrying means, said relay valve being responsive to inlet air manifold pressure, said relay valve being effective to cause said minimum signal to be delivered to said air jet control valve when inlet air manifold pressure is below a predetermined pressure and cause said maximum signal to be delivered to said air jet control valve when said inlet air manifold pressure is above a predetermined pressure, a jet assist cut-off valve connected to said signal pressure carrying means, said jet assist valve being responsive to inlet air manifold pressure, said cut-off valve means being effective to cause said signal to bypass said relay valve when said inlet air manifold pressure reaches a predetermined pressure, an acceleration control valve connected to said signal pressure carrying means, said acceleration control valve being responsive to fuel header pressure and inlet air manifold pressure, said acceleration control valve being effective to permit a maximum signal to be delivered to said air jet control valve when a predetermined balance is maintained between said fuel header pressure and said inlet manifold pressure, said acceleration control valve causing a minimum signal to be delivered to said air jet control valve when said balance is upset by fuel pressure increasing due to an increased load suddenly being thrown upon said engine.

10. A method of controlling the air and gas supply in an internal combustion engine having an exhaust driven turbocharger supplying air to the air inlet manifold, comprising the steps of providing an auxiliary turbocharger drive means, sensing the air inlet manifold pressure, sensing the gas pressure in the gas header, actuating the auxiliary means when a predetermined balance between gas pressure and air inlet manifold pressure is upset by a rapidly increasing load being thrown on the engine causing the gas pressure to increase relative to the inlet manifold pressure, and holding the gas pressure down as a function of air inlet manifold pressure to tend to maintain a predetermined balance between air inlet manifold pressure and gas header pressure.

11. A system for maintaining an approximately constant air-fuel ratio in an engine having an exhaust driven supercharger supplying air to the engine and a source of fuel, comprising auxiliary means for supplying additional energy to the supercharger in addition to the exhaust energy received by it from the engine, and means responsive to an unbalance between the inlet manifold pressure and the rate of fuel being supplied to actuate the auxiliary means when the engine is subjected to a rapid load increase.

12. The structure of claim 11 further characterized in that the source of fuel is gas and the unbalance responsive means is responsive to the relationship between inlet manifold pressure and gas pressure.

13. The structure of claim 11 further characterized by and including means for limiting the rate of increase of the fuel supply when a rapid load increase is applied to the engine.

14. The structure of claim 11 further characterized in that the auxiliary means includes a source of air under pressure connected to the supercharger.

15. The structure of claim 11 further characterized by and including means for energizing the auxiliary means to supply additional energy to the supercharger during starting of the engine and at low loads.

16. The structure of claim 15 further characterized by and including means for cutting off the energizing means when the engine has reached a predetermined load so that thereafter, as load increases, the auxiliary means will not supply additional energy to the supercharger.

17. The structure of claim 11 further characterized in that said last-mentioned means is constructed to limit the fuel supply as a function of inlet manifold pressure during engine operation.

18. A method of maintaining an approximately constant air-fuel ratio mixture in the cylinders of an engine supplied with gaseous fuel and having an exhaust driven supercharger, including the steps of providing an auxiliary source of energy for the supercharger capable of supplying energy to the supercharger in addition to the energy it receives from the exhaust gases, sensing the pressure of the air in the engine's inlet manifold, sensing the pressure of the gas in the gas header, establishing a balance between the inlet air pressure and the gas pressure corresponding to a theoretically proper air-fuel ratio, and energizing the auxiliary source of energy so as to supply aditional energy to the supercharger when the balance between inlet manifold pressure and gas pressure is upset due to a rapid load increase on the engine.

19. A method of maintaining an approximately constant air-fuel ratio mixture in an engine having an exhaust driven supercharger supplying air to the engine and a source for fuel, including the steps of providing an auxiliary source of energy for the supercharger capable of supplying energy to the supercharger in addition to the energy it receives from the exhaust gases, sensing the pressure of the air in the engine's inlet manifold, sensing the rate at which fuel is being supplied to the engine, establishing a balance between the inlet air pressure and the fuel rate corresponding to a theoretically proper air-fuel ratio, and energizing the auxiliary source of energy to supply additional energy to the supercharger when the balance between the inlet manifold pressure and the fuel rate is different from the balance representative of the theoretically proper air-fuel ratio.

20. The method of claim 19 further characterized by and including the step of using a gaseous fuel, and establishing a balance between the inlet air pressure and the gas fuel pressure corresponding to a theoretically proper air-fuel ratio.

21. The method of claim 19 further characterized by and including the step of supplying a source of air under pressure as the auxiliary source of energy for the supercharger.

22. The method of claim 19 further characterized by and including the step of limiting the rate of increase of the fuel supply when a rapid load increase is supplied to the engine.

23. The method of claim 19 further characterized by and including the step of energizing the auxiliary source of energy to supply additional energy to the supercharger during starting of the engine and at low loads.

24. A system for maintaining an approximately constant air-fuel ratio in an engine, an exhaust driven supercharger connected to the engine to receive and be driven by the exhaust gases from the engine and to supply air under pressure to the engine for combustion therein, a source of fuel connected to the engine to supply fuel to it, auxiliary means for supplying additional energy to the supercharger in addition to the exhaust energy received by it from the engine, and means responsive to an unbalance between the inlet manifold pressure and the rate at which fuel is being supplied to the engine to energize the auxiliary means to thereby supply additional energy to the supercharger.

25. The structure of claim 24 further characterized in that the source of fuel is gas and the unbalance responsive means is responsive to the relationship between inlet manifold pressure and gas pressure.

26. The structure of claim 24 further characterized in that the auxiliary means includes a source of air under pressure connected to the supercharger.

27. The structure of claim 24 further characterized by and including means for limiting the rate of increase of the fuel supply when a rapid load increase is applied to the engine.

28. The structure of claim 24 further characterized by and including means for cutting off the energizing means when the engine has reached a predetermined load so that thereafter, as load increases, the auxiliary means will not supply additional energy to the supercharger.

29. The structure of claim 24 further characterized in that said last-mentioned means is constructed to limit the fuel supply as a function of inlet manifold pressure during engine operation.

References Cited in the file of this patent
UNITED STATES PATENTS

| | | |
|---|---|---|
| 2,379,455 | Prince | July 3, 1945 |
| 2,533,714 | Coar | Dec. 12, 1950 |
| 2,608,051 | Nettel | Aug. 26, 1952 |
| 2,620,621 | Nettel | Dec. 9, 1952 |
| 2,893,366 | Nystrom | July 7, 1959 |
| 2,921,431 | Sampietro | Jan. 19, 1960 |